United States Patent
Palmby

(10) Patent No.: US 7,832,125 B1
(45) Date of Patent: Nov. 16, 2010

(54) PLANT TRANSPLANTING APPARATUS

(76) Inventor: Chris D. Palmby, 1107 Carolina St., Bellingham, WA (US) 98229

( * ) Notice: Subject to any disclaimer, the term of this patent is extended or adjusted under 35 U.S.C. 154(b) by 72 days.

(21) Appl. No.: 12/346,359

(22) Filed: Dec. 30, 2008

(51) Int. Cl.
- A01B 13/00 (2006.01)
- A01G 23/06 (2006.01)
- B62B 1/00 (2006.01)
- B66C 3/02 (2006.01)
- E02F 3/02 (2006.01)

(52) U.S. Cl. .............................. 37/302; 37/434; 37/188; 294/24; 294/50.9; 294/55; 294/57; 294/81.62; 294/119.1; 294/53.5; 30/335

(58) Field of Classification Search ................. 37/302, 37/434, 188, 187; 294/24, 57, 55, 119.1, 294/53.5, 81.62, 50.9; 30/335
See application file for complete search history.

(56) References Cited

U.S. PATENT DOCUMENTS

| | | | |
|---|---|---|---|
| 1,763,176 A | 6/1930 | Rourke | |
| 1,895,214 A | 1/1933 | Stork | |
| 2,735,712 A | 2/1956 | Hart | |
| 3,350,866 A | 11/1967 | Spencer | |
| 3,572,129 A * | 3/1971 | Walthier et al. | 73/864.31 |
| 3,643,410 A | 2/1972 | Menning | |
| 3,833,250 A | 9/1974 | Lawrence | |
| 3,916,540 A | 11/1975 | Ortiz | |
| 4,292,794 A | 10/1981 | Gascon | |
| 4,929,010 A * | 5/1990 | Lahti | 294/16 |
| 5,459,988 A | 10/1995 | Glaser | |
| 5,558,378 A | 9/1996 | Byrd | |
| 5,727,828 A | 3/1998 | Jones | |
| D402,171 S | 12/1998 | Miller | |
| 5,960,891 A * | 10/1999 | Sheehan et al. | 172/381 |
| 6,068,315 A | 5/2000 | Vaughter | |
| 6,120,073 A | 9/2000 | Jones | |
| 6,886,319 B2 | 5/2005 | Nam | |
| 7,121,599 B2 * | 10/2006 | Demar et al. | 294/60 |
| 7,306,274 B2 | 12/2007 | Renny | |
| 2003/0184104 A1 * | 10/2003 | Ping | 294/57 |
| 2008/0040892 A1 * | 2/2008 | Jenkins | 16/426 |

* cited by examiner

*Primary Examiner*—Christopher J. Novosad

(57) ABSTRACT

A plant transplanting apparatus includes a pair of hand spade assemblies each having a post with a top end and a bottom end and a blade that has a top edge and a bottom edge. The top edge is attached to the bottom end of the post and a grip is attached to the top end of the post. A coupling assembly releasably couples the hand spade assemblies together. The coupling assembly engages the posts to allow the first sides of the blades to be pivoted toward or away from each other. The coupling assembly is adjustable to allow a space between the spade assemblies to be selectively adjusted. The blades are extended into soil on either side of a plant and the blades are pivoted toward each other to lift the plant from the soil to allow the plant to be transplanted.

10 Claims, 4 Drawing Sheets

PLANT TRANSPLANTING APPARATUS

BACKGROUND OF THE DISCLOSURE

Field of the Disclosure

The disclosure relates to plant transplanting devices and more particularly pertains to a new plant transplanting device for assisting a person in digging up and transplanting a plant.

SUMMARY OF THE DISCLOSURE

An embodiment of the disclosure meets the needs presented above by generally comprising a pair of hand spade assemblies each having a height of less than 24 inches. Each of the spade assemblies includes a post having a top end and a bottom end and a blade that has a top edge, a bottom edge, a first lateral edge, a second lateral edge, a first side and a second side. The top edge is attached to the bottom end of the post and a grip is attached to the top end of the post. A coupling assembly releasably couples the hand spade assemblies together. The coupling assembly engages the posts to allow the first sides of the blades to be pivoted toward or away from each other. The coupling assembly is adjustable to allow a space between the spade assemblies to be selectively adjusted. The blades are extended into soil on either side of a plant and the blades are pivoted toward each other to lift the plant from the soil to allow the plant to be transplanted.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
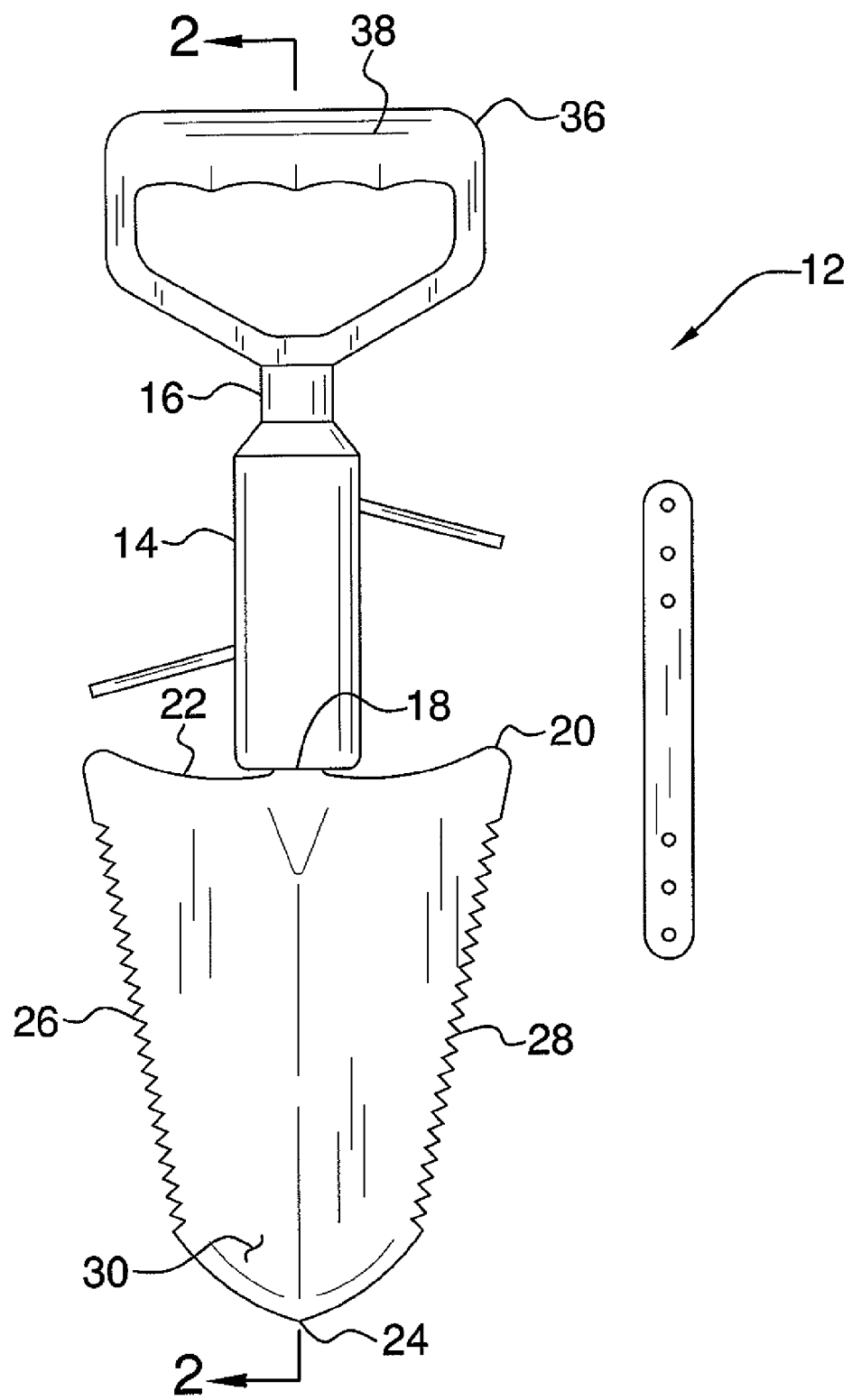
FIG. 1 is a front view of a hand spade assembly of a plant transplanting apparatus according to an embodiment of the disclosure.

With reference now to the drawings, and in particular to FIGS. 1 through 4 thereof, a new plant transplanting device embodying the principles and concepts of an embodiment of the disclosure and generally designated by the reference numeral 10 will be described.

Figure 2:
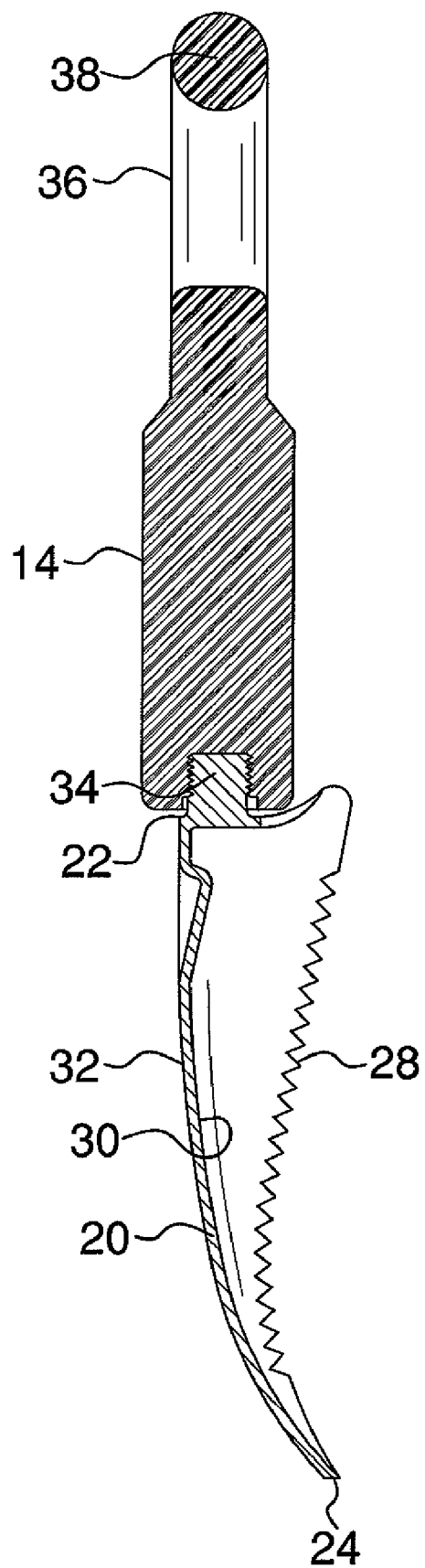
FIG. 2 is a cross-sectional view taken along line 2-2 of FIG. 1 of an embodiment of the disclosure.

As best illustrated in FIGS. 1 through 4, the plant transplanting apparatus 10 generally comprises a pair of hand spade assemblies 12 each having an overall height of less than 24 inches. Each of the spade assemblies 12 includes a post 14 that has a top end 16 and a bottom end 18. The spade assemblies 12 each also include a blade 20 that has a top edge 22, a bottom edge 24, a first lateral edge 26, a second lateral edge 28, a first side 30 and a second side 32. The top edge 22 of the blade 20 is attached to the bottom end 18 of the post 14. This may be accomplished with a threaded connection 34 as shown in FIG. 2 to allow the blade 20 to be removed from the post 14 for replacement purposes or to allow different shapes and types of blades to be used with the apparatus 10. The first side 30 is concavely curved from the top edge 22 to the bottom edge 24 to form a scoop adjacent to the bottom edge 24 which is pointed. The first side 30 is also concavely curved from the first lateral edge 26 to the second lateral edge 28. Each of the first 26 and second 28 lateral edges is serrated to assist the user of the apparatus 10 in cutting through plant material. A grip 36 is attached to the top end 16 of the post 14. The grip 36 comprises a closed loop that includes a linear section 38 positioned opposite of the post 14. The linear section 38 includes a plurality of finger indentations 40.

Figure 3:
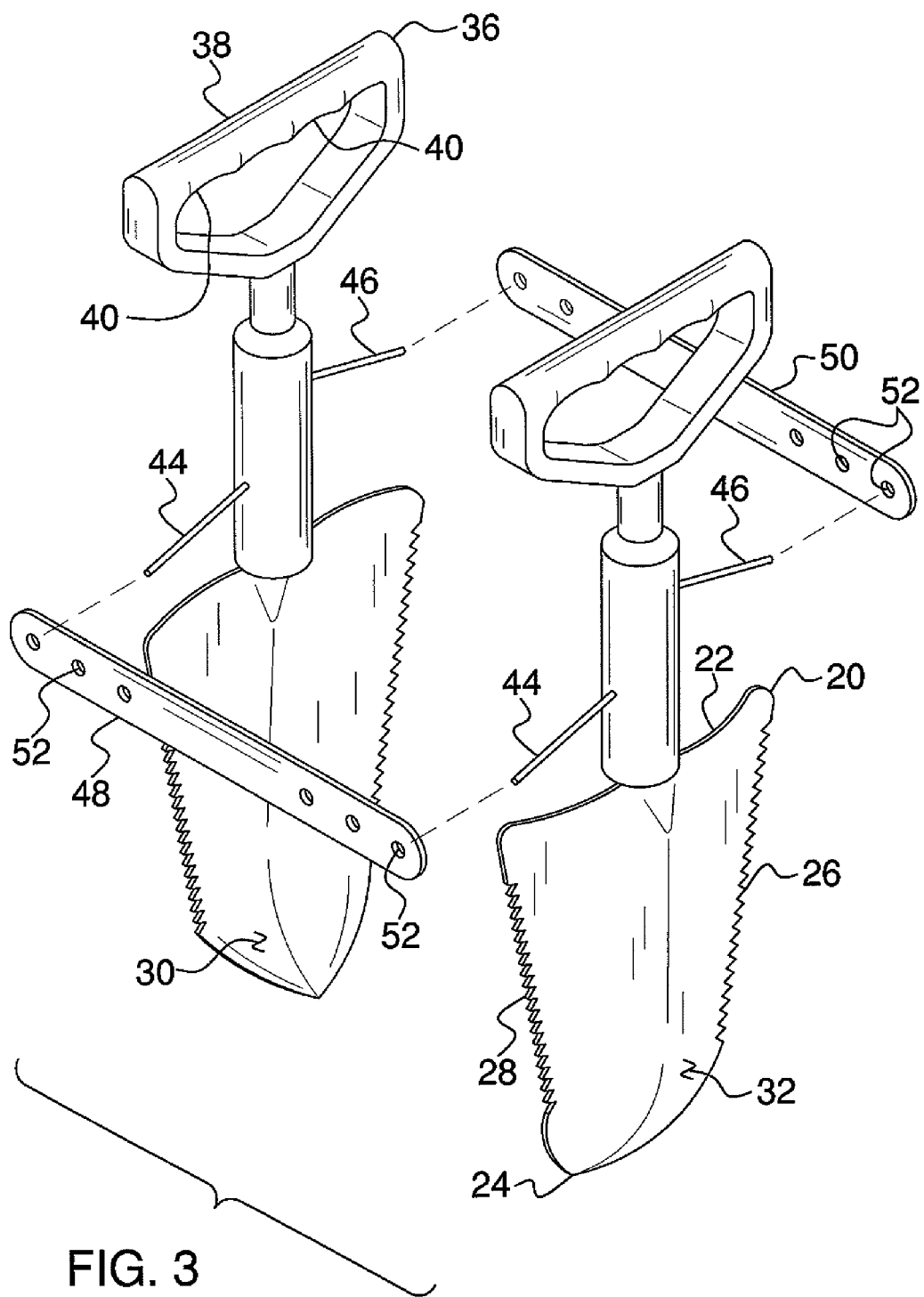
FIG. 3 is a perspective expanded view of an embodiment of the disclosure.
Figure 4:
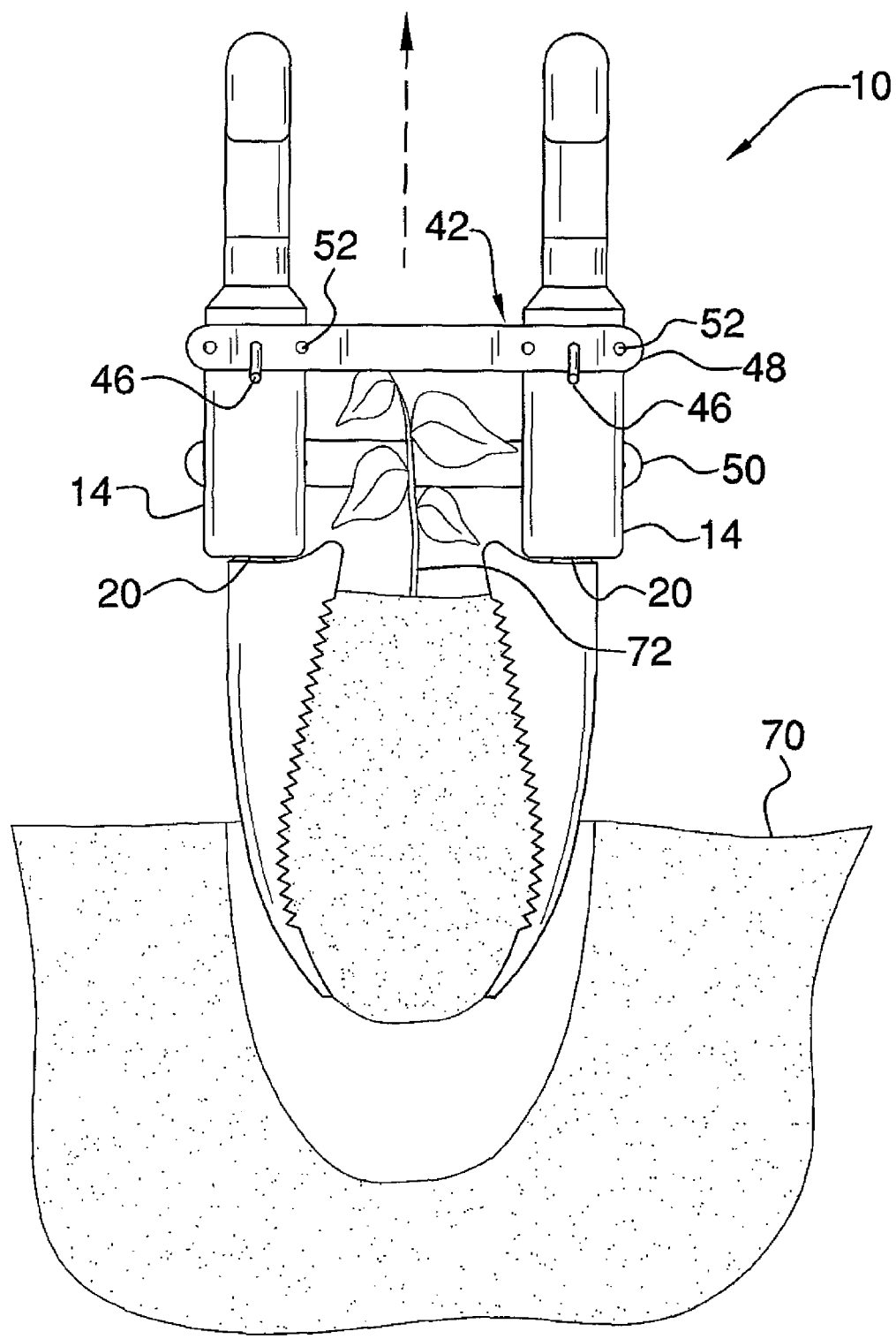
FIG. 4 is a side in-use view of an embodiment of the disclosure.

A coupling assembly 42 releasably couples the hand spade assemblies 12 together. The coupling assembly 42 engages the posts 14 to allow the first sides 30 of the blades 20 to be pivoted toward or away from each other. The coupling assembly 42 is adjustable to allow a space between the spade assemblies 12 to be selectively adjusted. The coupling assembly 42 includes a plurality of rods 44, 46. Each of the posts 14 has a pair of the rods 44, 46 attached thereto. Each of the pair of rods includes a first rod 44 and a second rod 46 extending in opposite directions with respect to each other. The rods 44, 46 are each angled toward an associated one of the blades 20. A pair of plates 48, 50 is provided. Each of the plates 48, 50 is elongated. Each of the plates 48, 50 has at least four apertures 52 extending therethrough and may include additional apertures 52 as is shown in FIG. 3. The first rods 44 extend through two of the apertures 52 in one of the plates 48 and the second rods 46 extend through two of the apertures 52 in another one of the plates 50 to pivotally couple together the posts 14 as is shown in FIG. 4. The rods 44, 46 and the plates 48, 50 allow for quick disconnecting of the posts 14 from each other as well as an uncomplicated means for adjusting the distance between the blades 20. As is shown in the Figures, the first rods 44 are aligned with each other and the second rods 46 are aligned with each other when corresponding ones of the blades 20 are also similarly aligned.

In use, as is shown in FIG. 4, the blades 20 are extended into soil 70 on either side of a plant 72 and the blades 20 are then pivoted toward each other to lift the plant 72 from the soil 70 to allow the plant 72 to be transplanted where desired. The blades 20 form not only the digging means but also the lifting and transporting means for the plant 72. The blades 20 may be separated from each other by any selectable distance with the coupling assembly 42 to accommodates plants 72 of various sizes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A plant transplanting apparatus to dig into soil on opposite sides of a plant to lift the plant out of the soil, said apparatus comprising:
 a pair of hand spade assemblies each having a height of less than 24 inches, each of said spade assemblies including;
  a post having a top end and a bottom end;
  a blade having a top edge, a bottom edge, a first lateral edge, a second lateral edge, a first side and a second side, said top edge being attached to said bottom end of said post;
  a grip being attached to said top end of said post;
 a coupling assembly releasably coupling said hand spade assemblies together, said coupling assembly engaging said posts to allow said first sides of said blades to be pivoted toward or away from each other, said coupling assembly being adjustable to allow a space between said spade assemblies to be selectively adjusted;
 said bottom edges of said blades being pivoted toward each other when said grips are pivoted away from each other; and
 wherein said blades are extended into the soil on either side of the plant and said blades are pivoted toward each other to lift the plant from the soil to allow the plant to be transplanted.

2. The apparatus according to claim 1, wherein said first side of said blade of each of said spade assemblies being concavely curved from said top edge to said bottom edge.

3. The apparatus according to claim 2, wherein said first side of said blade of each of said spade assemblies being concavely curved from said first lateral edge to said second lateral edge.

4. The apparatus according to claim 2, wherein each of said first and second lateral edges of said blade of each of said spade assemblies being serrated.

5. The apparatus according to claim 2, wherein said coupling assembly includes:
 a plurality of rods, each of said posts having a pair of said rods attached thereto, each of said rods of said pair of rods including a first rod and a second rod extending in opposite directions with respect to each other, each of said rods being angled toward an associated one of said blades; and
 a pair of plates, each of said plates being elongated, each of said plates having at least four apertures extending therethrough, said first rods extending through two of said apertures in one of said plates and said second rods extending through two of said apertures in another one of said plates to pivotally couple together said posts.

6. The apparatus according to claim 1, wherein said bottom edge of said blade of each of said spade assemblies being pointed.

7. The apparatus according to claim 1, wherein each of said first and second lateral edges of said blade of each of said spade assemblies being serrated.

8. The apparatus according to claim 1, wherein said grip of each of said spade assemblies comprising a closed loop including a linear section positioned opposite of the post and including a plurality of finger indentations.

9. The apparatus according to claim 1, wherein said coupling assembly includes:
 a plurality of rods, each of said posts having a pair of said rods attached thereto, each of said rods of said pair of rods including a first rod and a second rod extending in opposite directions with respect to each other, each of said rods being angled toward an associated one of said blades; and
 a pair of plates, each of said plates being elongated, each of said plates having at least four apertures extending therethrough, said first rods extending through two of said apertures in one of said plates and said second rods extending through two of said apertures in another one of said plates to pivotally couple together said posts.

10. A plant transplanting apparatus to dig into soil on opposite sides of a plant to lift the plant out of the soil, said apparatus comprising:
 a pair of hand spade assemblies each having a height of less than 24 inches, each of said spade assemblies including;
  a post having a top end and a bottom end;
  a blade having a top edge, a bottom edge, a first lateral edge, a second lateral edge, a first side and a second side, said top edge attached to said bottom end of said post, said first side being concavely curved from said top edge to said bottom edge, said bottom edge being pointed, said first side being concavely curved from said first lateral edge to said second lateral edge, each of said first and second lateral edges being serrated;
  a grip being attached to said top end of said post, said grip comprising a closed loop including a linear section positioned opposite of the post and including a plurality of finger indentations;
 a coupling assembly releasably coupling said hand spade assemblies together, said coupling assembly engaging said posts to allow said first sides of said blades to be pivoted toward or away from each other, said coupling assembly being adjustable to allow a space between said spade assemblies to be selectively adjusted, said coupling assembly including;
  a plurality of rods, each of said posts having a pair of said rods attached thereto, each of said rods of said pair of rods including a first rod and a second rod extending in opposite directions with respect to each other, each of said rods being angled toward an associated one of said blades;
  a pair of plates, each of said plates being elongated, each of said plates having at least four apertures extending therethrough, said first rods extending through two of said apertures in one of said plates and said second rods extending through two of said apertures in another one of said plates to pivotally couple together said posts;
 said bottom edges of said blades being pivoted toward each other when said grips are pivoted away from each other; and
 wherein said blades are extended into the soil on either side of the plant and said blades are pivoted toward each other to lift the plant from the soil to allow the plant to be transplanted.

* * * * *